US012273533B2

United States Patent
Izadi et al.

(10) Patent No.: US 12,273,533 B2
(45) Date of Patent: Apr. 8, 2025

(54) VIDEO STREAM ADAPTIVE FILTERING FOR BITRATE REDUCTION

(71) Applicant: Google LLC, Mountain View, CA (US)

(72) Inventors: Mohammad Izadi, San Jose, CA (US); Balineedu Adsumilli, Foster City, CA (US)

(73) Assignee: GOOGLE LLC, Mountain View, CA (US)

(*) Notice: Subject to any disclaimer, the term of this patent is extended or adjusted under 35 U.S.C. 154(b) by 193 days.

(21) Appl. No.: 17/416,235

(22) PCT Filed: Apr. 25, 2019

(86) PCT No.: PCT/US2019/029088
§ 371 (c)(1),
(2) Date: Jun. 18, 2021

(87) PCT Pub. No.: WO2020/139414
PCT Pub. Date: Jul. 2, 2020

(65) Prior Publication Data
US 2022/0078446 A1  Mar. 10, 2022

Related U.S. Application Data

(60) Provisional application No. 62/784,626, filed on Dec. 24, 2018.

(51) Int. Cl.
*H04N 19/147* (2014.01)
*H04N 19/105* (2014.01)
(Continued)

(52) U.S. Cl.
CPC ......... *H04N 19/147* (2014.11); *H04N 19/105* (2014.11); *H04N 19/117* (2014.11); *H04N 19/176* (2014.11); *H04N 19/82* (2014.11)

(58) Field of Classification Search
CPC .. H04N 19/147; H04N 19/105; H04N 19/117; H04N 19/176; H04N 19/82;
(Continued)

(56) References Cited

U.S. PATENT DOCUMENTS

| 7,450,771 B2 | 11/2008 | Chen et al. |
| 8,204,128 B2 | 6/2012 | Huchet et al. |
| 2003/0053709 A1 | 3/2003 | Olivieri |

FOREIGN PATENT DOCUMENTS

| CN | 102450009 A | 5/2012 |
| WO | 98/07117 A1 | 2/1998 |

(Continued)

OTHER PUBLICATIONS

International Search Report and Written Opinion of International Application No. PCT/US2019/029088, dated Jul. 30, 2019, 14 pgs.

*Primary Examiner* — Joseph W Becker
(74) *Attorney, Agent, or Firm* — Young Basile Hanlon & MacFarlane, P.C.

(57) ABSTRACT

Adaptive filtering is used video stream for bitrate reduction. A first copy of the input video stream is encoded to a reference bitstream. Each of a number of candidate filters is applied to each frame of a second copy of the input video stream to produce a filtered second copy of the input video stream. The filtered second copy is encoded to a candidate bitstream. A cost value for the candidate filter is determined based on distortion value and bitrate differences between the candidate bitstream and the reference bitstream. The candidate bitstream corresponding to the candidate filter with a lowest one of the cost values is selected as the output bitstream, which is then output or stored. Processing the input video stream using the adaptive filter and before the encoding may result in bitrate reduction, thereby improving compression, decompression, and other performance.

20 Claims, 10 Drawing Sheets

(51) Int. Cl.
*H04N 19/117* (2014.01)
*H04N 19/176* (2014.01)
*H04N 19/82* (2014.01)

(58) Field of Classification Search
CPC ...... H04N 19/19; H04N 19/194; H04N 19/48; H04N 19/85
See application file for complete search history.

(56) References Cited

FOREIGN PATENT DOCUMENTS

| | | | |
|---|---|---|---|
| WO | WO-2006056940 A1 * | 6/2006 | ............. H04N 19/85 |
| WO | 2010/123855 A1 | 10/2010 | |
| WO | 2017/133660 A1 | 8/2017 | |

* cited by examiner

VIDEO STREAM ADAPTIVE FILTERING FOR BITRATE REDUCTION

CROSS REFERENCE TO RELATED APPLICATION(S)

This disclosure claims the benefit of U.S. Provisional Application No. 62/784,626, filed Dec. 24, 2018, the disclosure of which is herein incorporated by reference in its entirety.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for encoding an input video stream to an output bitstream according to an implementation of this disclosure comprises encoding a first copy of the input video stream to a reference bitstream. The method further comprises comparing the input video stream and the reference bitstream to determine a first distortion value and a first bitrate for the reference bitstream. The method further comprises, for each candidate filter of a number of candidate filters: applying the candidate filter to each frame of a second copy of the input video stream to produce a filtered second copy of the input video stream; encoding the filtered second copy of the input video stream to a candidate bitstream; comparing the input video stream and the candidate bitstream to determine a second distortion value and a second bitrate for the candidate bitstream; and determining a cost value for the candidate filter based on a difference between the first distortion value and the second distortion value and based on a difference between the first bitrate and the second bitrate. The method further comprises selecting, as the output bitstream, the candidate bitstream corresponding to the candidate filter with a lowest one of the cost values. The method further comprises outputting or storing the output bitstream.

In some implementations of the method, the candidate filters are obtained using at least one of a genetic algorithm, a gradient descent algorithm, or another non-linear optimization technique.

In some implementations of the method, applying a given candidate filter to a given frame of the second copy of the input video stream to produce the filtered second copy of the input video stream comprises: transforming values within the given frame from a spatial domain into a frequency domain; after the transforming, applying the given candidate filter to each block of the given frame to produce filtered frequency domain values; and inverse transforming the filtered frequency domain values from the frequency domain to the spatial domain.

In some implementations of the method, applying the given candidate filter to each block of the frame to produce the filtered frequency domain values comprises denoising overlapping block regions of the frame using the given candidate filter.

In some implementations of the method, the overlapping block regions are half-overlapping block regions.

In some implementations of the method, determining the cost value for a given candidate filter of the number of candidate filters comprises: calculating a weighted value by applying a weight to the difference between the first distortion value and the second distortion value; and determining the cost value by subtracting the weighted value from the difference between the first bitrate and the second bitrate.

In some implementations of the method, the weight is defined based on a target of the second distortion value.

An apparatus for encoding an input video stream to an output bitstream according to an implementation of this disclosure comprises a memory and a processor configured to execute instructions stored in the memory. The instructions include instructions to encode a first copy of the input video stream to a reference bitstream. The instructions further include instructions to compare the input video stream and the reference bitstream to determine a first distortion value and a first bitrate for the reference bitstream. The instructions further include instructions to, for each candidate filter of a number of candidate filters: apply the candidate filter to each frame of a second copy of the input video stream to produce a filtered second copy of the input video stream; encode the filtered second copy of the input video stream to a candidate bitstream; compare the input video stream and the candidate bitstream to determine a second distortion value and a second bitrate for the candidate bitstream; and determine a cost value for the candidate filter based on a difference between the first distortion value and the second distortion value and based on a difference between the first bitrate and the second bitrate. The instructions further include instructions to select, as the output bitstream, the candidate bitstream corresponding to the candidate filter with a lowest one of the cost values. The instructions further include instructions to output or store the output bitstream.

In some implementations of the apparatus, the candidate filters are obtained using at least one of a genetic algorithm, a gradient descent algorithm, or another non-linear optimization technique.

In some implementations of the apparatus, the instructions to apply a given candidate filter to a given frame of the second copy of the input video stream to produce the filtered second copy of the input video stream include instructions to: transform values within the given frame from a spatial domain into a frequency domain; after the transforming, apply the given candidate filter to each block of the given frame to produce filtered frequency domain values; and inverse transform the filtered frequency domain values from the frequency domain to the spatial domain.

In some implementations of the apparatus, the instructions to apply the given candidate filter to each block of the frame to produce the filtered frequency domain values include instructions to denoise overlapping block regions of the frame using the given candidate filter.

In some implementations of the apparatus, the overlapping block regions are half-overlapping block regions.

In some implementations of the apparatus, the instructions to determine the cost value for a given candidate filter of the number of candidate filters include instructions to: calculate a weighted value by applying a weight to the difference between the first distortion value and the second distortion value; and determine the cost value by subtracting the weighted value from the difference between the first bitrate and the second bitrate.

In some implementations of the apparatus, the weight is defined based on a target of the second distortion value.

An encoder for encoding an input video stream to an output bitstream according to an implementation of this disclosure performs operations comprising encoding a first copy of the input video stream to a reference bitstream. The operations further comprise comparing the input video stream and the reference bitstream to determine a first distortion value and a first bitrate for the reference bitstream. The operations further comprise, for each candidate filter of a number of candidate filters: applying the candidate filter to each frame of a second copy of the input video stream to produce a filtered second copy of the input video stream; encoding the filtered second copy of the input video stream to a candidate bitstream; comparing the input video stream and the candidate bitstream to determine a second distortion value and a second bitrate for the candidate bitstream; and determining a cost value for the candidate filter based on a difference between the first distortion value and the second distortion value and based on a difference between the first bitrate and the second bitrate. The operations further comprise selecting, as the output bitstream, the candidate bitstream corresponding to the candidate filter with a lowest one of the cost values. The operations further comprise outputting or storing the output bitstream.

In some implementations of the encoder, the candidate filters are obtained using at least one of a genetic algorithm, a gradient descent algorithm, or another non-linear optimization technique.

In some implementations of the encoder, applying a given candidate filter to a given frame of the second copy of the input video stream to produce the filtered second copy of the input video stream comprises: transforming values within the given frame from a spatial domain into a frequency domain; after the transforming, applying the given candidate filter to each block of the given frame to produce filtered frequency domain values; and inverse transforming the filtered frequency domain values from the frequency domain to the spatial domain.

In some implementations of the encoder, applying the given candidate filter to each block of the frame to produce the filtered frequency domain values comprises denoising overlapping block regions of the frame using the given candidate filter.

In some implementations of the encoder, the overlapping block regions are half-overlapping block regions.

In some implementations of the encoder, determining the cost value for a given candidate filter of the number of candidate filters comprises: calculating a weighted value by applying a weight to the difference between the first distortion value and the second distortion value; and determining the cost value by subtracting the weighted value from the difference between the first bitrate and the second bitrate.

In some implementations of the encoder, the weight is defined based on a target of the second distortion value.

These and other aspects of this disclosure are disclosed in the following detailed description of the implementations, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
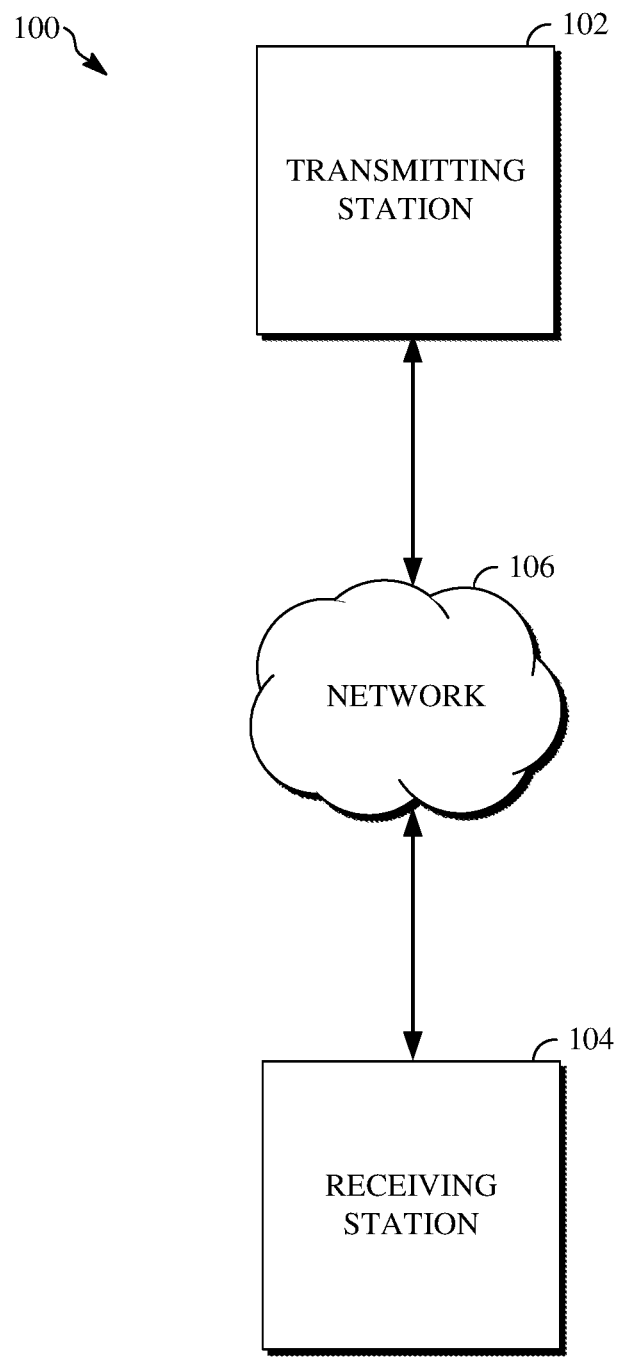
FIG. 1 is a schematic of an example of a video encoding and decoding system.

Video compression schemes may include breaking respective images, or frames, into smaller portions, such as blocks, and generating a compressed bitstream using techniques to limit the information included for respective blocks in the output. The compressed bitstream can be decoded to re-create the source images from the limited information. Typical video compression techniques include reducing the bitrate of a video stream, such as to reduce transmission costs for video hosting and serving platforms.

However, reducing the bitrate of a video stream often results in quality loss such that the later decompressed video stream is of a lower quality than the original video stream processed using the compression technique. For example, undesirable blocking artifacts may be introduced during the compression of a video stream. In some cases, those blocking artifacts may remain in the video stream after it is decompressed.

In some cases, pre-processing can be performed against a video stream before it is compressed using a video compression scheme. Performing the pre-processing can result in improving the video quality for fixed bitrate video streams or minimize the bitrate for fixed quality video streams. For example, the pre-processing can include applying a filter to the video stream to remove noise and reduce artifacts (e.g., blocking, banding, ringing, temporal flicker, etc.) within the video stream before the encoding of the video stream to an output bitstream. However, such filter-based approaches used fixed filters, which are dependent upon a selected bitrate and/or selected quality of the video stream. Thus, a typical fixed filter as used in video stream pre-processing cannot minimize bitrate or maximize quality.

Furthermore, the parameters used by such a fixed filter are dependent upon the content of the image blocks within the frames of the video stream. As such, a typical fixed filter is often more useful in removing artifacts from video edge textures than in removing artifacts from homogeneous areas of image blocks. However, conventional approaches for estimating fixed filter parameters often cause unwanted distortion within the frames of the video stream and may also affect the compression process in a complex and non-linear manner.

Implementations of this disclosure address problems such as these by pre-processing a video stream using adaptive filtering for bitrate reduction. A first copy of the input video stream is encoded to a reference bitstream. Each of a number of candidate filters is applied to each frame of a second copy of the input video stream to produce a filtered second copy of the input video stream. The filtered second copy is encoded to a candidate bitstream. A cost value for the candidate filter is determined based on distortion value and bitrate differences between the candidate bitstream and the reference bitstream. The candidate bitstream corresponding to the candidate filter with a lowest one of the cost values is selected as the output bitstream, which is then output or stored. Processing the input video stream using the adaptive filter and before the encoding may result in bitrate reduction, thereby improving compression, decompression, and other performance.

Further details of techniques for video stream adaptive filtering for bitrate reduction are described herein with initial reference to a system in which they can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
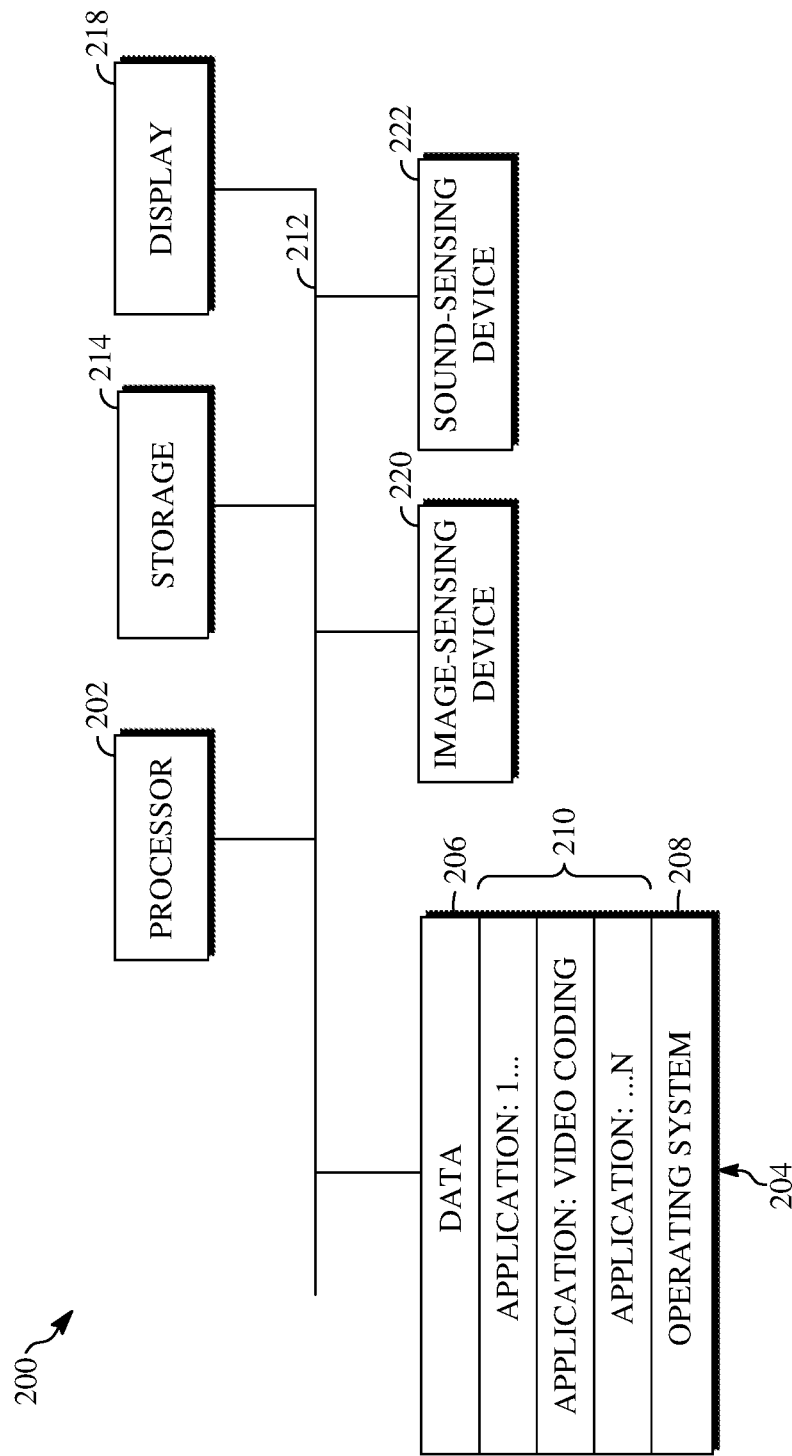
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video and/or image coding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
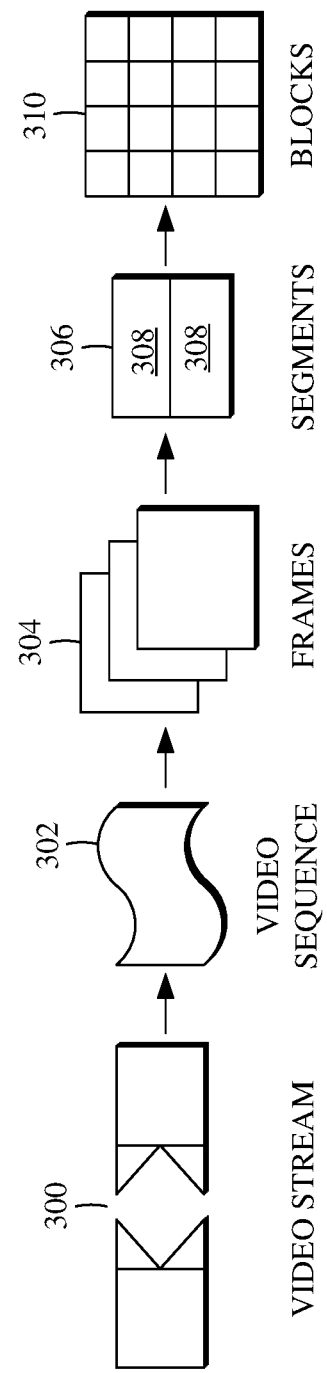
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
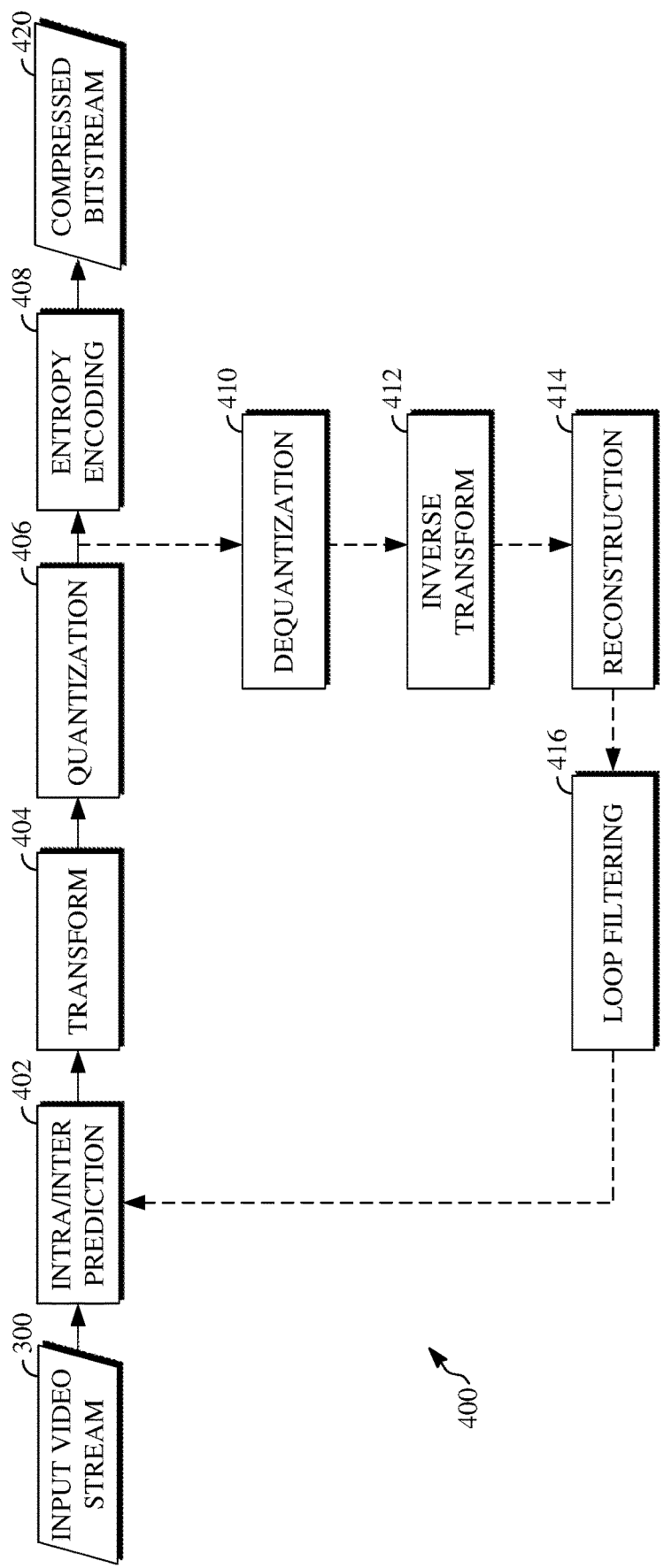
FIG. 4 is a block diagram of an example of an encoder according to implementations of this disclosure.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation: a deblocking filter as in AVC, HEVC, VP9, and AV1; a Constrained Directional Enhancement Filter as in AV1; and a loop restoration filter as in AV1.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
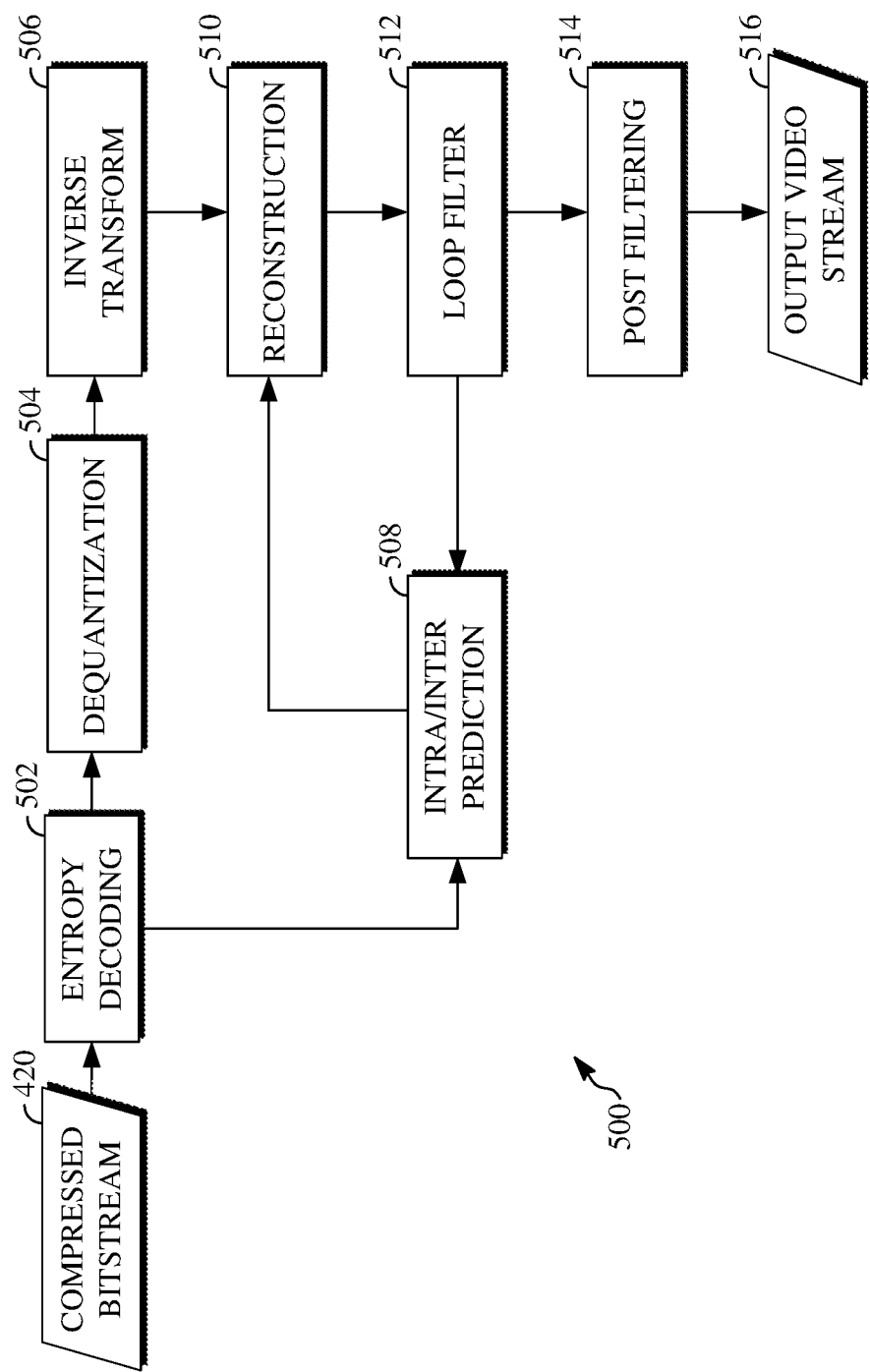
FIG. 5 is a block diagram of an example of a decoder according to implementations of this disclosure.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Examples of filters which may be applied at the loop filtering stage 512 include, without limitation: a deblocking filter as in AVC, HEVC, VP9, and AV1; a Constrained Directional Enhancement Filter as in AV1; and a loop restoration filter as in AV1.

Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514.

Figure 6:
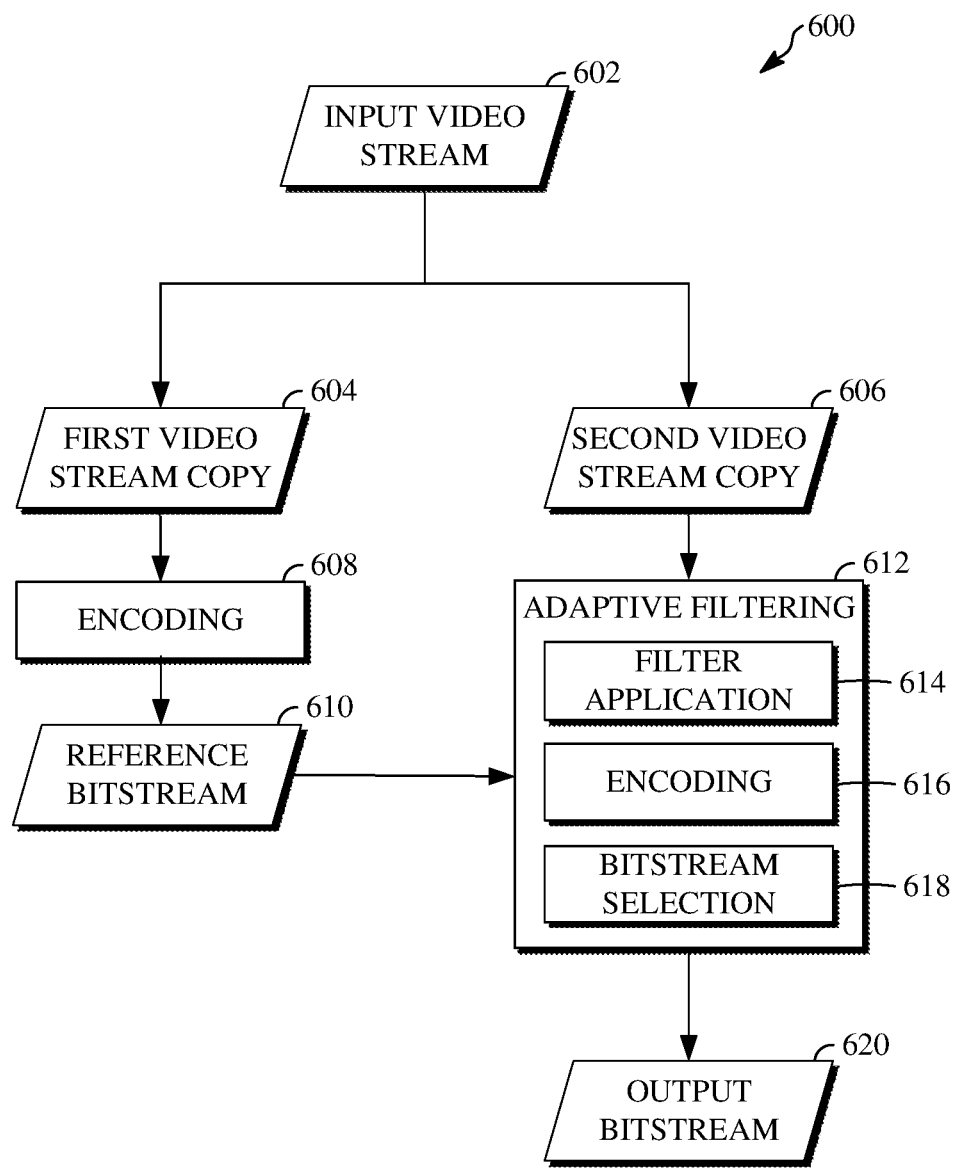
FIG. 6 is a block diagram of an example of a video stream processing pipeline using adaptive filtering for bitrate reduction.

FIG. 6 is a block diagram of an example of a video stream processing pipeline 600 using adaptive filtering for bitrate reduction. The pipeline 600 may include or be used in connection with an encoder, for example, the encoder 400 shown in FIG. 4. At the beginning of the pipeline 600, an input video stream 602 is received. The input video stream 602 may, for example, be the video stream 300 shown in FIG. 4. The input video stream 602 is copied to result in a first video stream copy 604 and a second video stream copy 606. Initially, the first video stream copy 604 and the second video stream copy 606 represent identical copies of the input video stream 602.

At an encoding stage 608 of the pipeline 600, the first video stream copy 604 is encoded to a reference bitstream 610. The encoding stage 608 may include one or more stages of an encoder (e.g., the encoder 400) at which the data of the first video stream copy 604 is processed. For example, the encoding stage 608 can include at least a prediction stage, a transformation stage, a quantization stage, and an entropy coding stage (e.g., the intra/inter prediction stage 402, the transformation stage 404, the quantization stage 406, and the entropy encoding stage 408 shown in FIG. 4).

The reference bitstream 610 is a compressed bitstream, such as the compressed bitstream 420 output from the encoding stages shown in FIG. 4. The first video stream copy 604 is encoded to the reference bitstream 610 using defined transcode settings, for example, a constant quality setting, a constant rate factor setting, or both. The input video stream 602 and the reference bitstream 610 can be compared to determine a distortion value and a bitrate for the reference bitstream 610. The distortion value represents a measurement of the amount of distortion introduced to the input video stream by encoding the first copy of the input video stream to the reference bitstream. The bitrate represents a measurement of the number of bits per time unit (e.g., second) which are used to transmit the reference bitstream.

The distortion value for the reference bitstream 610 may be determined using one of a number of error calculation techniques. For example, the distortion value may be a peak signal-to-noise (PSNR) measurement, a mean square error (MSE) measurement, a structural similarity index (SSI) measurement, or another measurement determined using a different error calculation technique. As applicable, PSNR, MSE, SSI, or other distortion measurements as disclosed herein can be determining using conventional approaches.

The second video stream copy 606 is processed at an adaptive filtering stage 612 of the pipeline 600. The adaptive filtering stage 612 includes a filter application stage 614, an encoding stage 616, and a bitstream selection stage 618. The filter application stage 614 and the encoding stage 616 include operations repeated for each of a number of candidate filters, such as to encode different copies of the second video stream copy 606 to candidate bitstreams, in which each of the candidate bitstreams corresponds to and is produced using one of the candidate filters. The bitstream selection stage 618 includes operations performed after the candidate bitstreams are produced, such as to select one of those candidate bitstreams as an output bitstream 620.

At the filter application stage 614, a candidate filter is applied to each video frame of the second video stream copy 606. Applying a candidate filter to each video frame of the second video stream copy 606 causes a change to at least some data of the second video stream copy 606. For example, applying a candidate filter can introduce a number of blurring artifacts within the second video stream copy 606. In another example, applying a candidate filter can introduce an amount of noise within the second video stream copy 606. In yet another example, applying a candidate filter can enhance the sharpness for some or all image objects within the second video stream copy 606.

The candidate filters are two-dimensional filters of size M×N, where M and N may be the same number or different numbers. Each of the candidate filters may be of the same size. Alternatively, some of the candidate filters may have different sizes from others. As a further alternative, in some cases, each of the candidate filters may be of a different size.

The candidate filters include a number of coefficients. The particular number of coefficients of a candidate filter depends on the size of the candidate filter. For example, a filter of size 32×32 includes 1,024 coefficients. Each coefficient of a candidate filter has a value ranging from 0 to 1, inclusive. Thus, the values of the coefficients of a candidate filter representing smoothing weights which are applied to pixel values within the video frames of the second video stream copy 606.

Some or all of the candidate filters may be obtained using a non-linear optimization technique. For example, some or all of the candidate filters may be obtained using one or more of a genetic algorithm, a gradient descent algorithm, or another non-linear optimization technique. Alternatively, the candidate filters may be obtained from a list defining the candidate filters to apply to the second video stream copy 606. For example, a lookup table, object notation file, or other data source can indicate the candidate filters to use.

The candidate filters are applied to cause a decrease in the quality of the second video stream copy 606. As such, after the application of a candidate filter, the resulting filtered second video stream copy has a lower quality than the second video stream copy 606. The decrease in the quality caused by the application of the filter may relate to video data that is imperceptible or relatively imperceptible to a human viewer.

Each of the candidate filters may correspond to a different type of change which can be made to the data within the second video stream copy 606. In some cases, two or more of the candidate filters may correspond to the same type of change, but represent a different magnitude or degree thereof. For example, first and second filters may both correspond to adding blurring artifacts, where the first filter adds artifacts of a first blurred amount and the second adds artifacts of a second blurred amount. In another example, the first filter may add a first number of blurring artifacts to each video frame of the second video stream copy 606 and the second filter may add a second number of blurring artifacts to each video frame of the second video stream copy 606.

At the encoding stage 616, after a filtered second video stream copy is produced by applying a candidate filter to the second video stream copy 606, the filtered second video stream copy is encoded to a candidate bitstream. The encoding stage 616 may include one or more stages of an encoder (e.g., the encoder 400) at which the data of the filtered second video stream copy is processed. For example, the encoding stage 616 can include at least a prediction stage, a transformation stage, a quantization stage, and an entropy coding stage (e.g., the intra/inter prediction stage 402, the transformation stage 404, the quantization stage 406, and the entropy encoding stage 408).

A candidate bitstream is produced for each filtered second video stream copy. A candidate bitstream is a compressed bitstream, such as the compressed bitstream 420. The filtered second video stream copy may be encoded to a candidate bitstream using defined transcode settings, for example, a constant quality setting, a constant rate factor setting, or both. Alternatively, the filtered second video stream copy may be encoded to a candidate bitstream using transcode settings of the corresponding candidate filter.

At the bitstream selection stage 618, after the candidate bitstreams are produced, one of those candidate bitstreams is selected as the output bitstream 620, which may, for example, be output or stored for further processing (e.g., using a decoder, such as the decoder 500 shown in FIG. 5). The output bitstream 620 is selected based on cost values determined for each of the candidate bitstreams.

To determine the cost value for a candidate bitstream, the candidate bitstream is first compared to the input video stream 602, such as to determine a distortion value and a bitrate for the candidate bitstream. The distortion value represents a measurement of the amount of distortion introduced to the second video stream copy 606 by the application of the corresponding candidate filter and the subsequent encoding the filtered second video stream copy to the reference bitstream. The bitrate represents a measurement of the number of bits per time unit (e.g., second) which are used to transmit the candidate bitstream. The distortion value for each candidate bitstream may be determined using PSNR, MSE, SSI, or another distortion measurement technique.

After the distortion value and the bitrate for the candidate bitstream are determined, a cost value for that candidate bitstream can be determined based on a difference between the distortion value of the reference bitstream 610 and the distortion value of the candidate bitstream and further based on a difference between the bitrate of the reference bitstream 610 and the bitrate of the candidate bitstream. After cost values are determined for each of the candidate bitstreams, the candidate bitstream with the lowest one of the cost values is selected as the output bitstream 620.

Other variations of the 600 may be used to encode the input video stream 602 to the output bitstream 620. As described herein, the candidate bitstreams may be iteratively produced, such as by individually applying to candidate filters to the second video stream copy 606 and then by individually encoding the resulting filtered second video stream copy to a candidate bitstream. However, in some implementations, the candidate bitstreams may be produced after all of the filtered second video stream copies are produced by the filter application stage 614.

For example, instead of taking each candidate filter, applying it to the second video stream copy 606 and then encoding the resulting filtered second video stream copy to a candidate bitstream, the filter application stage 614 can produce filtered second video stream copies for some or all of the candidate filters. After the filter application stage 614 has finished its processing, the encoding stage 616 can receive each of the filtered second video stream copies and encode each of them to respective candidate bitstreams.

In some implementations, one or more of the filter application stage 614, the encoding stage 616, or the bitstream selection stage 618 may be external to the adaptive filtering stage 612. For example, the adaptive filtering stage may be limited to applying the candidate filters to individual copies of the second video stream copy 606. In such an implementation, the input to the encoding stage 616 may be the output of the adaptive filtering stage 612.

In some implementations, the pipeline 600 may include a cost value determination stage that is separate from the bitstream selection stage 618. For example, the cost value determination stage can perform operations described above with respect to the bitstream selection stage 618, such as for determining the cost values for the candidate filters and corresponding candidate bitstreams. The cost value determination stage may be part of the adaptive filtering stage 612 or occur after the adaptive filtering stage 612 in the pipeline 600.

In some implementations, the encoding stage 608 and the encoding stage 616 may be replaced by a single encoding stage of the pipeline 600. For example, the encoding stage can receive the first video stream copy 604 as input and output the reference bitstream 610. Similarly, the encoding stage can receive a filtered second video stream copy produced by the filter application stage 614 and output a candidate bitstream, such as for further processing at the bitstream selection stage 618.

Figure 7:
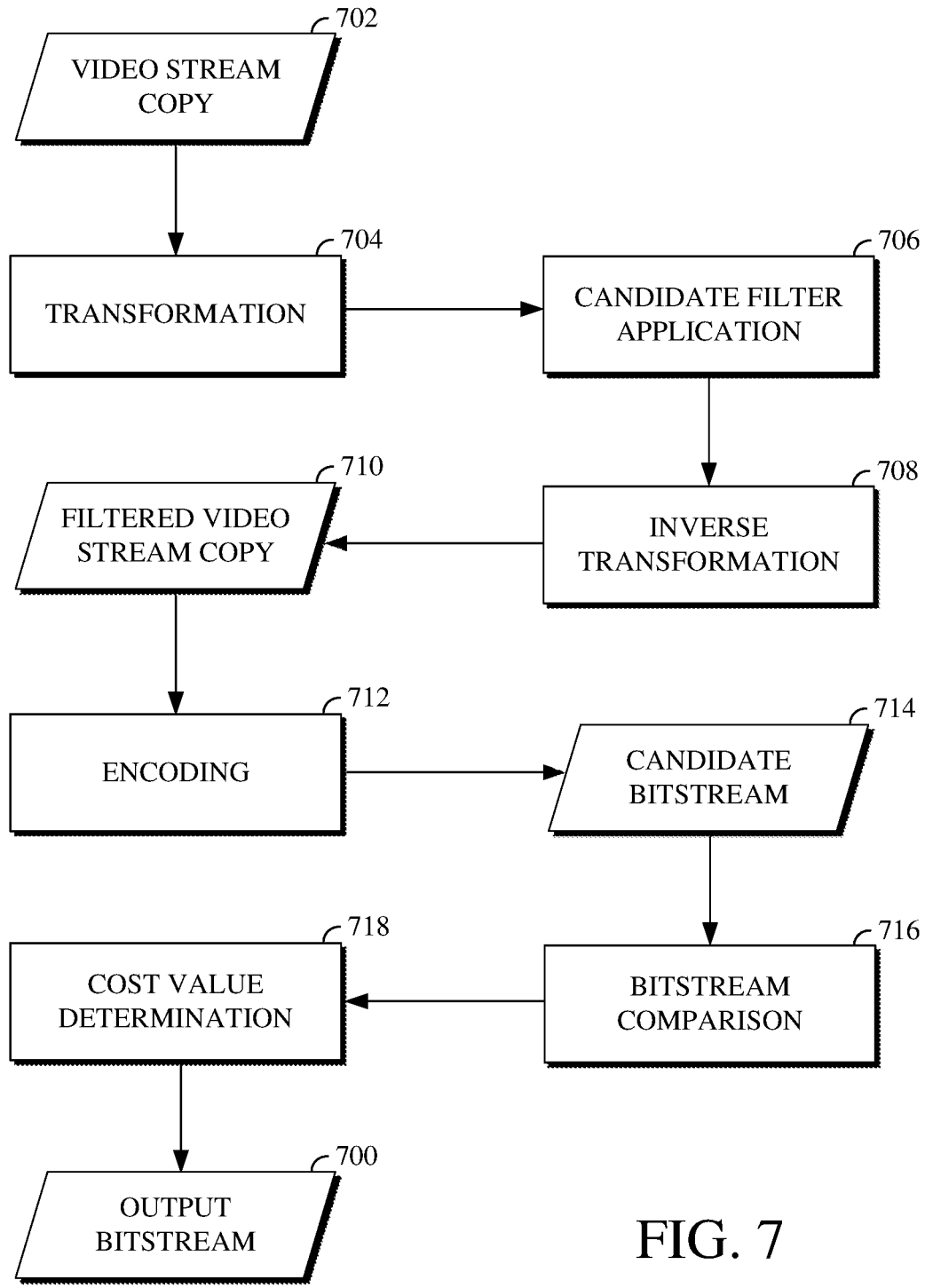
FIG. 7 is a block diagram of an example of operations performed for selecting an output bitstream using adaptive filtering.

FIG. 7 is a block diagram of an example of operations performed for selecting an output bitstream using adaptive filtering. For example, the operations shown and described with respect to FIG. 7 may represent operations performed at one or more of the filter application stage 614, the encoding stage 616, and/or the bitstream selection stage 618 shown in FIG. 6. The operations shown and described with respect to FIG. 7 are performed to encode an input video stream to an output bitstream 700, such as by using a video stream copy 702 representing a copy of the input video stream to produce a candidate bitstream that is selected as the output bitstream 700. For example, the output bitstream 700 and the video stream copy 702 may respectively be the output bitstream 620 and the second video stream copy 606 shown in FIG. 6.

A first portion of the processing includes a transformation stage 704, a candidate filter application stage 706, and an inverse transformation stage 708, which perform operations to produce a filtered video stream copy 710. That is, the first portion of the processing is performed to apply a candidate filter to each frame of the video stream copy 702 to produce the filtered video stream copy 710.

For a given frame of the video stream copy 702, at the transformation stage 704, each of the blocks of the frame is transformed from the spatial domain into the frequency domain. Transforming a given block of the frame can include applying a two-dimensional fast Fourier transform or like transform against the pixel values within the block. After the pixel values are transformed into the frequency domain, at the candidate filter application stage 706, the candidate filter is applied to produce filtered frequency domain values. The filtered frequency domain values are then inverse transformed at the inverse transformation stage 708 to return those values to the spatial domain. The output of the inverse transformation is the filtered video stream copy 710.

Applying a candidate filter to a given frame of the video stream copy 702 includes dividing the frame into a number of overlapping blocks of size P×Q, where P and Q may be the same number or different numbers. The candidate filter is then applied to overlapping block regions of the frame, such as to denoise those block regions. The overlapping block regions overlap may be half-overlapping, one quarter-overlapping, or overlapping by another amount. The denoising filter may be sequentially applied to overlapping block regions of the frame in raster order or in another order.

For example, for a frame of size 1,024×1,024 and a denoising filter of size 32×32, the filter is first applied to the block region of the frame from pixel location [0, 0] to [312, 312]. The next block region of the frame to which the denoising filter is applied is from pixel location [16, 0] to [478, 312]. This would repeat until the final application at the block region from pixel location [992, 992] to [10,234, 10,234]. Alternatively, the size of the denoising filter and/or the degree to which adjacent block regions overlap may change with each block region. For example, the degree of the overlap can be defined as, in each independent direction, a particular lag having a parameter value varying between 0 and N−1.

A second portion of the processing includes an encoding stage 712, at which the filtered video stream copy 710 is encoded to a candidate bitstream 714. The encoding stage 712 may, for example, be the encoding stage 616 shown in FIG. 6. For example, the encoding stage 712 can perform one or more operations for processing the data of the filtered video stream copy 710 to produce the candidate bitstream 714.

A third portion of the processing includes a bitstream comparison stage 716 and a cost value determination stage 718. At the bitstream comparison stage 716, the candidate bitstream 714 and the input video stream are compared to determine a distortion value and a bitrate of the candidate bitstream 714. At the cost value determination stage 718, the distortion value and the bitrate of the candidate bitstream 714 are used to determine a cost value for the candidate bitstream 714 (and thus also for the candidate filter used to produce the candidate bitstream 714).

For example, the cost value for the candidate bitstream 714 (and thus for the corresponding candidate filter) can be calculated as:

$$E(F)=B(T')-\alpha(D(T')-D(T))$$

where F is the candidate filter, E(F) is the cost value, T is a reference bitstream (e.g., the reference bitstream 610 shown in FIG. 6), T' is the candidate bitstream 714, B(T') is the bitrate of T', D(T') is the distortion value measured for T', D(T) is the distortion value measured for T', and $\alpha$ is a weight applied to the difference in the distortion values D(T') and D(T). The value of $\alpha$ may be defined based on a target bitrate for the video stream copy 702. For example, values of $\alpha$ which result in certain distortion values may be empirically identified.

In some cases, the difference between the distortion value of the reference bitstream and the distortion value of the candidate bitstream 714 may be non-linear. That is, whether the difference between those distortion values results in noticeable quality or bitrate reduction may depend on a distortion range within which the difference falls. For example, where those distortion values are each between 30 and 45 decibels, the difference between them is most visible.

Differences that are less than 25 decibels may result in significant quality loss that negatively affects the appearance of the video stream. Differences above 50 decibels may result in quality gains that are imperceptible to human viewers. Thus, reducing distortion values while remaining above 50 decibels allows for a deeper bitrate reduction. However, since quality differences are increasingly apparent below 50 decibels, there is less opportunity for bitrate reduction without affecting the quality of the video stream.

After the cost value is determined for the candidate bitstream 714, a determination is made as to whether that cost value is a lowest cost value calculated so far for the candidate bitstreams. If so, the candidate bitstream 714 is stored as the best candidate bitstream. Otherwise, the candidate bitstream 714 is discarded or otherwise not further used.

For example, cost values may be iteratively determined for the N candidate bitstreams produced using the respective N candidate filters. After a given cost value is determined for a given candidate bitstream, that cost value can be compared against a stored cost value representing the lowest cost value determined for the N-X candidate bitstreams that have been processed so far by the cost value determination stage 718. If the given cost value is lower than the stored cost value, that candidate bitstream is stored so as to replace the previously stored candidate bitstream. After the final (i.e., the $N^{th}$) candidate bitstream is processed, the stored candidate bitstream is selected as the output bitstream 700.

Other variations of the processing shown in FIG. 7 may be used to select the output bitstream 700. In some implementations, non-linear optimization techniques may be used to obtain the candidate filters. For example, some or all of the candidate filters may be obtained using one or more of a genetic algorithm, a gradient descent algorithm, or another non-linear optimization technique. In some implementations, optimization operations other than those of non-linear processing can be used to obtain the candidate filters. For example, a candidate filter can be obtained using a gradient distance function, a Lagrangian function, a linear search function (e.g., using restricted parameters), or the like. For example, with a linear search function, the value of a can be stepwise increased from 0 to 1 in 0.1 or other increments. As such, different candidate bitstreams can be determined for each of the stepwise increments of a.

Figure 8A:
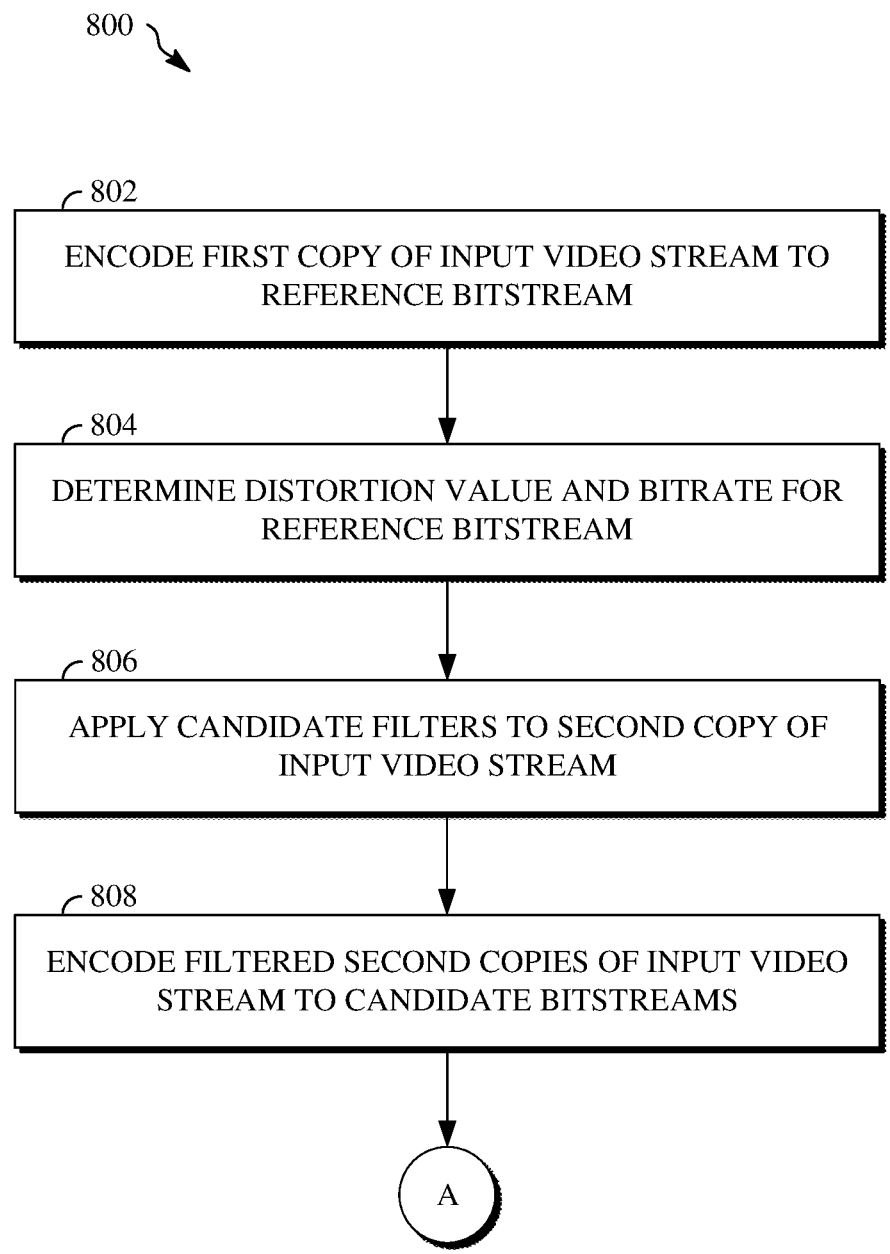
FIGS. 8A-B are flowchart diagrams of an example of a technique for encoding a video stream to an output bitstream using adaptive filtering.
Figure 8B:
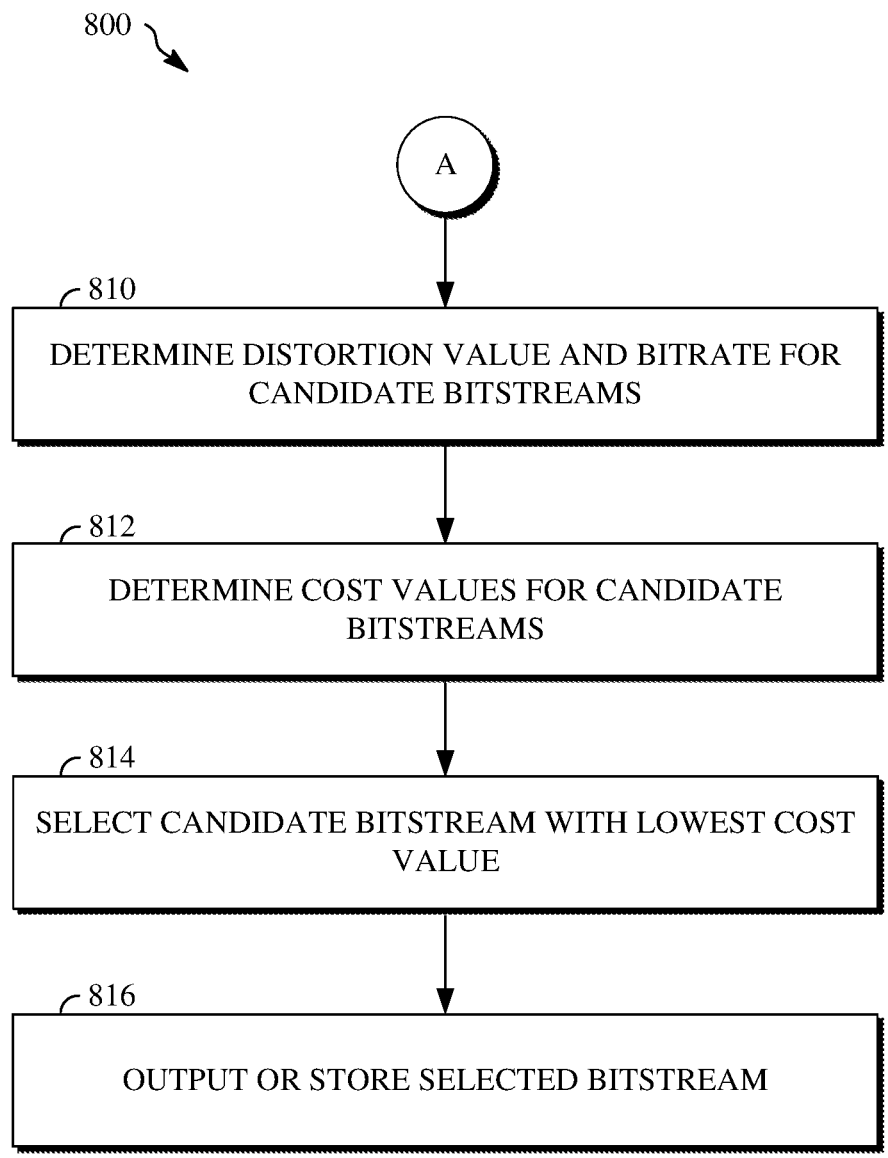
Figure 9:
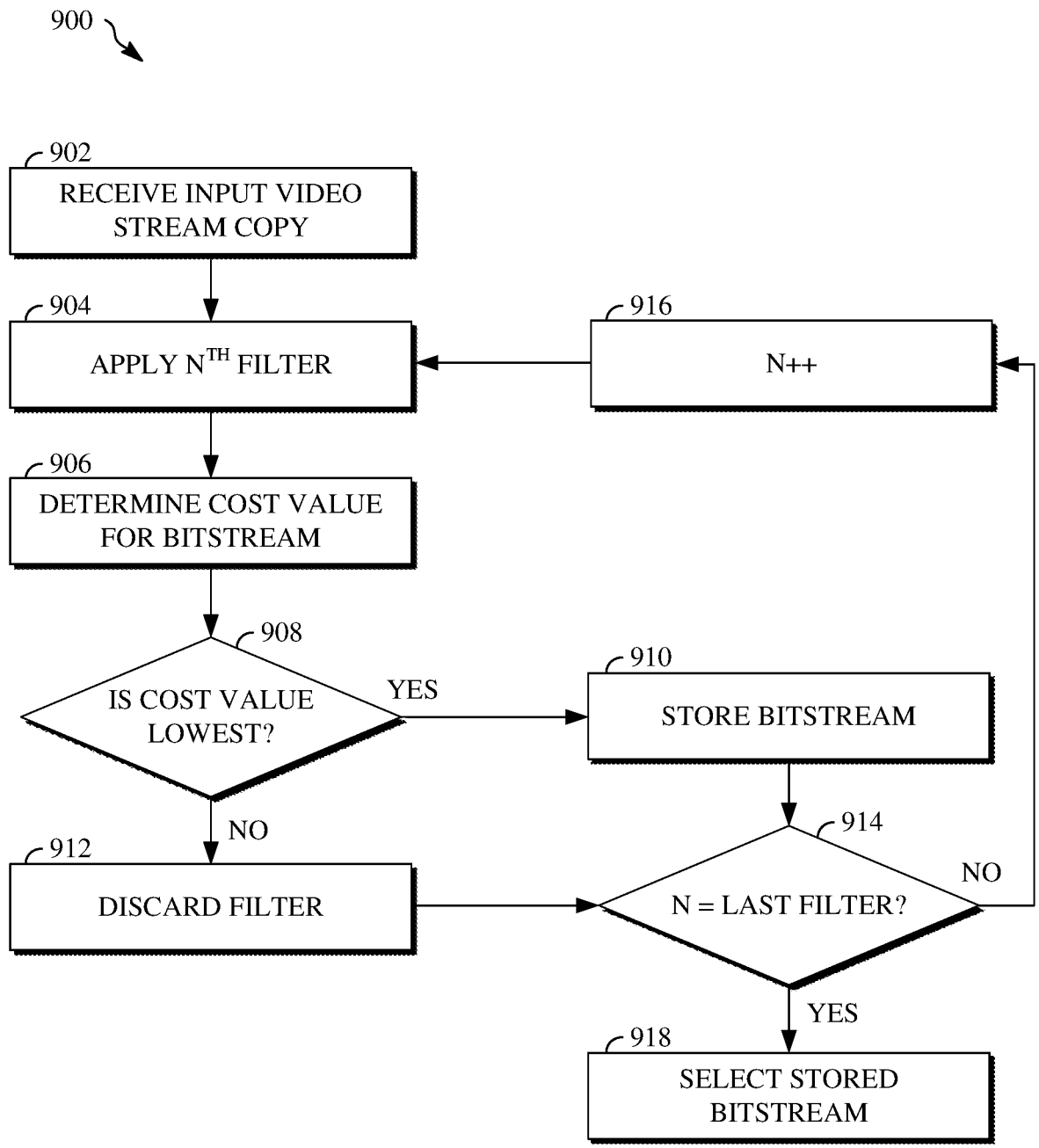
FIG. 9 is a flowchart diagram of an example of a technique for selecting an output bitstream based on cost values determined for candidate filters.

Further details of techniques for video stream adaptive filtering for bitrate reduction are now described. FIGS. 8A-B are flowchart diagrams of an example of a technique 800 for encoding a video stream to an output bitstream using adaptive filtering. FIG. 9 is a flowchart diagram of an example of a technique 900 for selecting an output bitstream based on cost values determined for candidate filters.

The technique 800 and/or the technique 900 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 800 and/or the technique 900. The technique 800 and/or the technique 900 can be implemented using specialized hardware or firmware. For example, a hardware component configured to perform the technique 800 and/or the technique 900. As explained above, some computing devices may have multiple memories or processors, and the operations described in the technique 800 and/or the technique 900 can be distributed using multiple processors, memories, or both.

For simplicity of explanation, the techniques 800 and 900 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIGS. 8A-B, the technique 800 for encoding an input video stream to an output bitstream using adaptive filtering is shown. At 802, a first copy of an input video stream is encoded to a reference bitstream. The first copy of the input video stream is an identical copy of the input video stream. Encoding the first copy of the input video stream to the reference bitstream can include using an encoder (e.g., the encoder 400 shown in FIG. 4) to perform prediction, transformation, quantization, and entropy coding operations against the frames of the first copy of the input video stream.

At 804, the input video stream and the reference bitstream are compared to determine a distortion value and a bitrate for the reference bitstream. The distortion value represents a measurement of the amount of distortion introduced to the input video stream by encoding the first copy of the input video stream to the reference bitstream. The bitrate represents a measurement of the number of bits per time unit (e.g., second) which are used to transmit the reference bitstream.

At 806, candidate filters are applied to a second copy of the input video stream to produce filtered second copies of the input video stream. Each of the filtered second copies of the input video stream corresponds to the single candidate filter used to produce it. Applying a candidate filter to the second copy of the input video stream includes, for each frame of the second copy of the input video stream, first transforming values within the frame from a spatial domain into a frequency domain. After the transforming, the candidate filter is applied to each block of the frame to produce filtered frequency domain values. The filtered frequency domain values are then inverse transformed from the frequency domain to the spatial domain. The inverse transformed values for each of the frames represent the values of the filtered second copy of the input video stream. A filtered second copy of the input video stream is produced for some or all of the candidate filters.

At 808, the filtered second copies of the input video stream are encoded to candidate bitstreams. Encoding a filtered second copy of the input video stream to a candidate bitstream can include using an encoder (e.g., the encoder 400 shown in FIG. 4) to perform prediction, transformation, quantization, and entropy coding operations against the frames of the filtered second copy of the input video stream.

At 810, a distortion value and a bitrate are determined for each of the candidate bitstreams. The distortion value and the bitrate for a candidate bitstream are determined by comparing the candidate bitstream to the input video stream. The distortion value represents a measurement of the amount of distortion introduced to the input video stream by applying the corresponding candidate filter and subsequently encoding the filtered second copy of the input video stream to the candidate bitstream. The bitrate represents a measurement of the number of bits per time unit (e.g., second) which are used to transmit the candidate bitstream.

At 812, cost values are determined for each of the candidate bitstreams, and, thus, for each of the candidate filters applied to the second copy of the input video stream. The cost value for a candidate bitstream is determined based on a difference between the distortion value of the reference bitstream and the distortion value of the candidate bitstream and further based on a difference between the bitrate of the reference bitstream and the bitrate of the candidate bitstream. In particular, a weighted value is calculated by applying a weight to the difference between the distortion value of the reference bitstream and the distortion value of the candidate bitstream. The cost value for the candidate bitstream can then be determined by subtracting the weighted value from the difference between the bitrate of the reference bitstream and the bitrate of the candidate bitstream.

At 814, the candidate bitstream having the lowest one of the cost values is selected as the output bitstream for the input video stream. Implementations and examples for selecting the output bitstream, including by iterating through the candidate bitstreams, are described below with respect to FIG. 9.

At 816, the output bitstream is output or stored. For example, the output bitstream may be transmitted to a decoder, such as for decoding to output bitstream into an output video stream. In another example, the output bitstream may be stored, such as for later use.

In some implementations, some or all of the operations described with respect to the technique 800 may be performed for individual candidate filters and then repeated for subsequent candidate filters. For example, the operations for applying a candidate filter to the second copy of the input video stream, encoding the filtered second copy of the input video stream to a candidate bitstream, determining a distortion value and a bitrate for the candidate bitstream, and determining a cost value for the candidate bitstream can be individually and iteratively performed for each candidate filter. For example, after the cost value for an $X^{th}$ candidate bitstream has been determined, the technique may then proceed to applying an $X+1^{th}$ candidate filter to the second copy of the input video stream, and so on.

Referring next to FIG. 9, the technique 900 for selecting an output bitstream based on cost values determined for candidate filters is shown. At 902, a copy of an input video stream is received. For example, the copy of the input video stream may be the video stream copy 702 shown in FIG. 7. The copy of the input video stream may represent a copy of an input video stream received at an encoder. Receiving the copy of the input video stream can include a computing aspect of the encoder, such as an adaptive filtering stage (e.g., the adaptive filtering stage 612 shown in FIG. 6), receiving the copy of the input video stream.

At 904, an $N^{th}$ filter is applied to each frame of the copy of the input video stream. The $N^{th}$ filter is one of a number of candidate filters available for filtering the copy of the input video stream. Applying the $N^{th}$ filter to each frame of the copy of the input video stream can include, for each such frame, transforming values within the given frame from a spatial domain into a frequency domain, applying the given candidate filter to each block of the given frame to produce filtered frequency domain values, and then inverse transforming the filtered frequency domain values from the frequency domain to the spatial domain.

At 906, a cost value is determined for a candidate bitstream produced after applying the $N^{th}$ filter to the copy of the input video stream. In particular, after the $N^{th}$ filter is applied to the copy of the input video stream, the resulting filtered copy of the input video stream is encoded to a candidate bitstream (e.g., using an encoder, such as the encoder 400 shown in FIG. 4). The input video stream and the candidate bitstream are then compared to determine a distortion value and a bitrate for the candidate bitstream. The cost value is then determined based on differences between the distortion value and the bitrate determined for the candidate bitstream and a distortion value and a bitrate determined for a reference bitstream.

At 908, a determination is made as to whether the cost value resulting from the application of the $N^{th}$ filter is a lowest cost value determined for the candidate bitstreams produced using the N candidate filters. For example, a current lowest cost value resulting from the application of a $N-X^{th}$ filter to produce a $N-X^{th}$ candidate bitstream may be stored in a buffer or other data store. Determining whether the cost value for the $N^{th}$ candidate bitstream is the lowest cost value can include comparing that cost value to the stored cost value. The cost value for the $N^{th}$ candidate bitstream is the lowest cost value where it is lower than the stored cost value.

At 910, responsive to a determination that the cost value for the $N^{th}$ candidate bitstream is the lowest cost value, the $N^{th}$ candidate bitstream is stored. Storing the $N^{th}$ candidate bitstream includes storing the $N^{th}$ candidate bitstream in the buffer or other data store so as to replace the $N-X^{th}$ candidate bitstream previously stored therein. For example, the $N^{th}$ candidate bitstream itself can be stored and/or an index or other indicator of the $N^{th}$ candidate bitstream may be stored. Alternatively, at 912, responsive to a determination that the cost value for the $N^{th}$ candidate bitstream is not the lowest cost value, the $N^{th}$ candidate bitstream is discarded.

At 914, a determination is made as to whether the $N^{th}$ filter is the final candidate filter remaining available for consideration. At 916, responsive to a determination that the $N^{th}$ filter is not the final candidate filter remaining available for consideration, the value of N is increased by one and the process repeats. Alternatively, at 918, responsive to a determination that the $N^{th}$ filter is the final candidate filter remaining available for consideration, the stored candidate bitstream is selected as the output bitstream. For example, if the $N^{th}$ candidate bitstream is stored in the buffer or other data store before the determination is made that the $N^{th}$ filter is the final remaining filter, then the $N^{th}$ candidate bitstream is selected as the output bitstream.

In some implementations, the technique 900 can include comparing one or more aspects of a candidate bitstream to a threshold. For example, the threshold can represent a maximum acceptable quality loss resulting from the application of the respective candidate filter and the subsequent encoding of the filtered video stream copy to the candidate bitstream. In another example, the threshold can represent a maximum acceptable latency resulting from the application of the respective candidate filter and the subsequent encoding of the filtered video stream copy to the candidate bitstream. In yet another example, the threshold can represent a maximum acceptable computational resource cost resulting from the application of the respective candidate filter and the subsequent encoding of the filtered video stream copy to the candidate bitstream.

In such an implementation, the one or more aspects of the candidate bitstream (e.g., the quality loss, latency, and/or computational resource cost thereof) is compared to the threshold (e.g., before determining whether the cost value for the candidate bitstream is a lowest cost value or before storing the candidate bitstream responsive to a determination that the candidate bitstream has a lowest cost value). Where the one or more aspects meet the threshold (e.g., by not exceeding the respective maximum values), the technique 900 may proceed to continue processing the candidate bitstream. However, in the event those one or more aspects do not meet the threshold, the candidate bitstream may be discarded or otherwise not further processed.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using the encoder 400, can encode content into an encoded video signal and transmit the encoded video signal to the communications device. In turn, the communications device can then decode the encoded video signal using the decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including the encoder 400 may also include the decoder 500.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for encoding an unfiltered input video stream to an output bitstream, the method comprising:
   encoding a first copy of the unfiltered input video stream to a reference bitstream;
   comparing the unfiltered input video stream and the reference bitstream to determine a first distortion value and a first bitrate for the reference bitstream;
   for each candidate filter of a number of candidate filters:
   applying the candidate filter to each frame of a second copy of the unfiltered input video stream to produce a filtered input video stream;
   encoding the filtered input video stream to a candidate bitstream;
   comparing the unfiltered input video stream and the candidate bitstream to determine a second distortion value and a second bitrate for the candidate bitstream; and
   determining a cost value for the candidate filter based on a difference between the first distortion value and the second distortion value and based on a difference between the first bitrate and the second bitrate;
   selecting, as the output bitstream, the candidate bitstream corresponding to the candidate filter with a lowest one of the cost values; and
   outputting or storing the output bitstream.

2. The method of claim 1, wherein the candidate filters are obtained using at least one of a genetic algorithm, a gradient descent algorithm, or another non-linear optimization technique.

3. The method of claim 1, wherein applying the candidate filter to a given frame of the second copy of the unfiltered input video stream to produce the filtered input video stream comprises:
   transforming values within the given frame from a spatial domain into a frequency domain;

after the transforming, applying the given-candidate filter to each block of the given frame to produce filtered frequency domain values; and inverse transforming the filtered frequency domain values from the frequency domain to the spatial domain.

4. The method of claim 3, wherein applying the candidate filter to each block of the frame to produce the filtered frequency domain values comprises:

denoising overlapping block regions of the frame using the candidate filter.

5. The method of claim 4, wherein the overlapping block regions are half-overlapping block regions.

6. The method of claim 1, wherein determining the cost value for the candidate filter of the number of candidate filters comprises:

calculating a weighted value by applying a weight to the difference between the first distortion value and the second distortion value; and determining the cost value by subtracting the weighted value from the difference between the first bitrate and the second bitrate.

7. The method of claim 6, wherein the weight is defined based on a target of the second distortion value.

8. An apparatus for encoding an unfiltered input video stream to an output bitstream, the apparatus comprising:

a processor configured to:

encode a first copy of the unfiltered input video stream to a reference bitstream;

compare the unfiltered input video stream and the reference bitstream to determine a first distortion value and a first bitrate for the reference bitstream;

for each candidate filter of a number of candidate filters:

apply the candidate filter to each frame of a second copy of the unfiltered input video stream to produce a filtered input video stream;

encode the filtered input video stream to a candidate bitstream;

compare the unfiltered input video stream and the candidate bitstream to determine a second distortion value and a second bitrate for the candidate bitstream; and determine a cost value for the candidate filter based on a difference between the first distortion value and the second distortion value and based on a difference between the first bitrate and the second bitrate;

select, as the output bitstream, the candidate bitstream corresponding to the candidate filter with a lowest one of the cost values; and output or store the output bitstream.

9. The apparatus of claim 8, wherein the candidate filters are obtained using at least one of a genetic algorithm, a gradient descent algorithm, or another non-linear optimization technique.

10. The apparatus of claim 8, wherein to apply the candidate filter to a given frame of the second copy of the unfiltered input video stream to produce the filtered input video stream comprises to:

transform values within the given frame from a spatial domain into a frequency domain;

after the transforming, apply the candidate filter to each block of the given frame to produce filtered frequency domain values; and inverse transform the filtered frequency domain values from the frequency domain to the spatial domain.

11. The apparatus of claim 10, wherein to apply the candidate filter to each block of the frame to produce the filtered frequency domain values comprises to:

denoise overlapping block regions of the frame using the candidate filter.

12. The apparatus of claim 11, wherein the overlapping block regions are half-overlapping block regions.

13. The apparatus of claim 8 wherein to determine the cost value for the candidate filter of the number of candidate filters comprises to:

calculate a weighted value by applying a weight to the difference between the first distortion value and the second distortion value; and determine the cost value by subtracting the weighted value from the difference between the first bitrate and the second bitrate.

14. The apparatus of claim 13, wherein the weight is defined based on a target of the second distortion value.

15. A non-transitory computer readable medium storing instructions operable to cause one or more processors to perform operations for encoding an unfiltered input video stream to an output bitstream, the operations comprising:

encoding a first copy of the unfiltered input video stream to a reference bitstream;

comparing the unfiltered input video stream and the reference bitstream to determine a first distortion value and a first bitrate for the reference bitstream;

for each candidate filter of a number of candidate filters:

applying the candidate filter to each frame of a second copy of the unfiltered input video stream to produce a filtered input video stream;

encoding the filtered input video stream to a candidate bitstream;

comparing the unfiltered input video stream and the candidate bitstream to determine a second distortion value and a second bitrate for the candidate bitstream; and determining a cost value for the candidate filter based on a difference between the first distortion value and the second distortion value and based on a difference between the first bitrate and the second bitrate;

selecting, as the output bitstream, the candidate bitstream corresponding to the candidate filter with a lowest one of the cost values; and outputting or storing the output bitstream.

16. The non-transitory computer readable medium of claim 15, wherein the candidate filters are obtained using at least one of a genetic algorithm, a gradient descent algorithm, or another non-linear optimization technique.

17. The non-transitory computer readable medium of claim 15 wherein applying the candidate filter to a given frame of the second copy of the unfiltered input video stream to produce the filtered input video stream comprises:

transforming values within the given frame from a spatial domain into a frequency domain;

after the transforming, applying the candidate filter to each block of the given frame to produce filtered frequency domain values; and inverse transforming the filtered frequency domain values from the frequency domain to the spatial domain.

18. The non-transitory computer readable medium of claim 17, wherein applying the candidate filter to each block of the frame to produce the filtered frequency domain values comprises:

denoising overlapping block regions of the frame using the candidate filter.

19. The non-transitory computer readable medium of claim 18, wherein the overlapping block regions are half-overlapping block regions.

20. The non-transitory computer readable medium of claim 15, wherein determining the cost value for the candidate filter of the number of candidate filters comprises:
- calculating a weighted value by applying a weight to the difference between the first distortion value and the second distortion value; and
- determining the cost value by subtracting the weighted value from the difference between the first bitrate and the second bitrate,
- wherein the weight is defined based on a target of the second distortion value.

* * * * *